Figure 3:
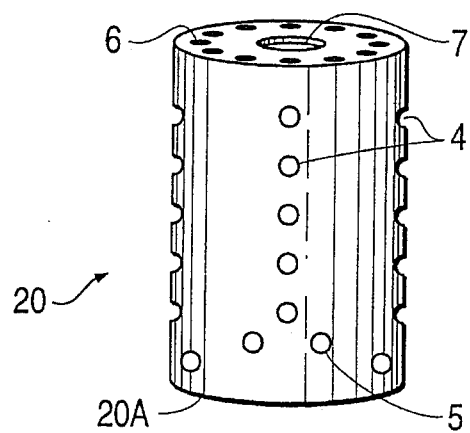

United States Patent [19]
Landro et al.

[11] Patent Number: 5,572,486
[45] Date of Patent: Nov. 5, 1996

[54] SEISMIC AIRGUN ARRANGEMENT

[75] Inventors: Martin Landro; Jan Langhammer, both of Trondheim, Norway

[73] Assignee: Den norske stats oljeselskap a.s, Stavanger, Norway

[21] Appl. No.: 367,314

[22] Filed: Apr. 13, 1995

[30] Foreign Application Priority Data

Aug. 25, 1992 [NO] Norway .................................. 923314

[51] Int. Cl.⁶ .................................................. H04R 23/00
[52] U.S. Cl. .......................... 367/144; 181/115; 181/120
[58] Field of Search ............................. 367/144; 181/115, 181/120

[56] References Cited

U.S. PATENT DOCUMENTS 3,525,416  8/1970  Mott-Smith .................................. 181/5
3,724,590  4/1973  Knudsen .............................. 181/5 XC
4,006,794  2/1977  Itria ............................................ 181/115

*Primary Examiner*—J. Woodrow Eldred
*Attorney, Agent, or Firm*—Foley & Lardner

[57] ABSTRACT

Seismic airgun arrangement for attenuating unwanted oscillations in the emitted signal. The airgun has one or more outlet ports (9) for exhausting air in a generally radial direction from a central axis of the airgun (10), and a perforated screen (20) of plate material is provided around the airgun for the attenuation mentioned. The volume generally delimited within the screen (20) is significantly smaller than the maximum bubble size which is normally generated by the airgun (10). The screen (20) has an open side or end (20A) at a part of the screen that is adapted to face at least partially downward in the normal operative position of the airgun (10). At least edge portions of the screen along the open side or end (20A) are located substantially directed opposite the outlet port or ports (9).

10 Claims, 4 Drawing Sheets

FIG. 1
PRIOR ART
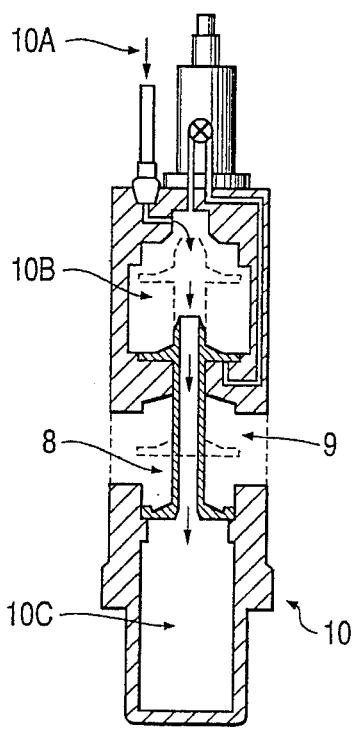
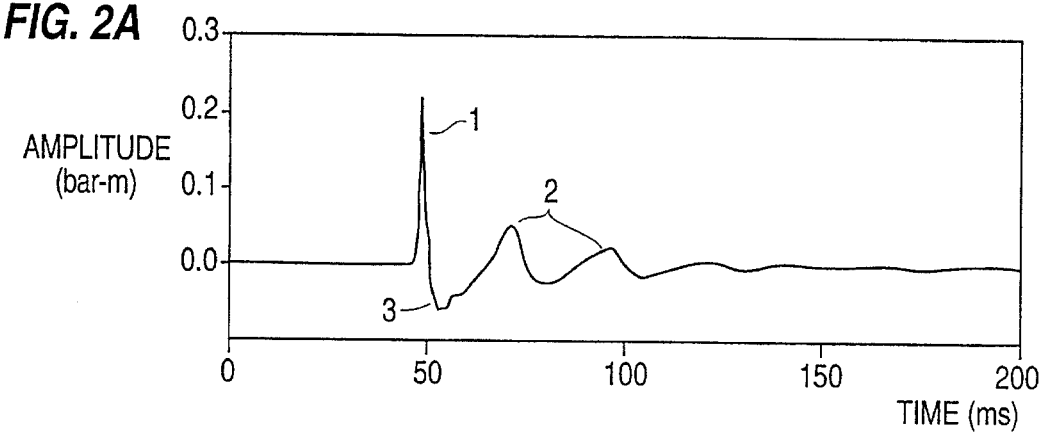
FIG. 2A
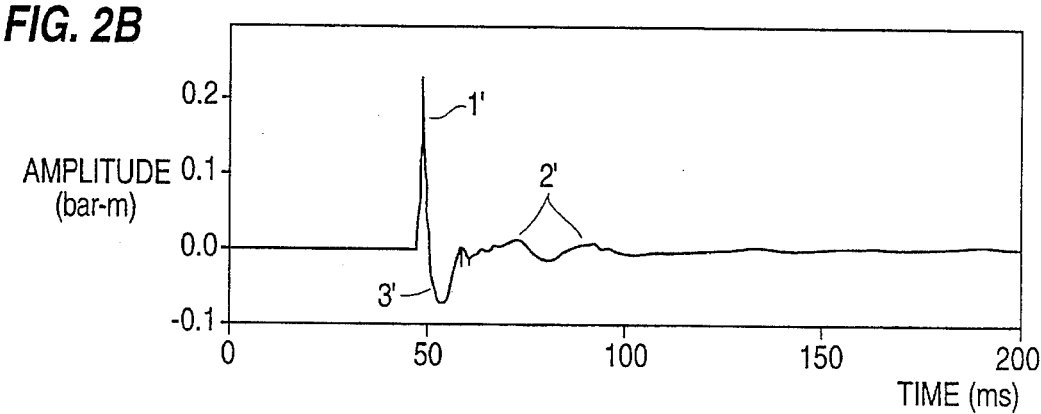
FIG. 2B 5,572,486

SEISMIC AIRGUN ARRANGEMENT

This invention relates to a seismic airgun arrangement for attenuating unwanted oscillations in the emitted signal, whereby the airgun has one or more outlet ports for exhausting air in a generally radial direction from a central axis of the airgun, and whereby a perforated screen of plate material is provided around the airgun for the attenuation mentioned.

Thus, the invention comprises a hydrodynamic screen being mounted externally of a seismic airgun. The purpose of the screen is in part to destroy and baffle the air bubble formed when a seismic airgun is fired.

In marine seismic data acquisition an airgun is the mostly employed acoustic source. In such airguns the sound is generated by letting high pressure air (100–200 atmospheres) escape through port openings in the airgun. One of the drawbacks of the airgun as a seismic source is the fact that the signal generated has an oscillating nature, i.e. the signal is not a pure transient pressure pulse. Because of the oscillating air bubble which is formed in the water, there will be emitted several subsequent pressure pulses in addition to the primary pulse or amplitude. As a consequence of this the sound signal being emitted down into the water and the subsurface formation will be long (in terms of time), and this makes it difficult to interpret the seismic data being collected.

In order to avoid bubble oscillations as mentioned above four usual methods are in use today:

1. Employing many airguns of different volumes:
2. Arrangement of airguns in clusters; i.e. arranging the airguns quite close to each other.

The two first methods above involve the employment of interaction effects and the fact that different airgun volumes give different signals so as to compose a resulting signal being more optimal, i.e. wherein the bubble pulses will partially cancel each other. The GI airgun actually consists of two airguns in one and the same unit, where one airgun is used for generating the signal, whereas the other airgun is used for attenuating the bubble. The drawback of this airgun (which is the airgun emitting the most optimal signal) is that it is more expensive than conventional airguns, as well as it requires twice or thrice as much high pressure air as conventional airguns. The "Waveshapekit" mentioned above consists of a plate with holes provided inside the actual pressure chamber in the airgun. This leads to an improved signal, but a disadvantage with this "Waveshapekit", however, is that the primary signal is also weakened.

Another method which is not in commercial use is described in U.S. Pat. No. 3,525,416, which relates to an air operated seismic source inside a completely closed, perforated screen. This known source with a screen, however, is so large and impractical for commercial seismic operations that it is not used.

An object of this invention is to provide a novel and improved arrangement of seismic airguns for attenuating the unwanted bubble oscillations. In view of the known techniques just referred to above, this, according to the invention, is obtained in an arrangement as stated initially above, thereby that the volume which is generally delimited within the screen is significantly smaller than the maximum bubble size which is normally generated by the airgun, that the screen has an open side or end at a part of the screen being adapted to face at least partially downwards in the normal operative position of the airgun, and that at least edge portions of the screen along the open side or end are located substantially directly opposite the outlet port or ports.

Figure 4:
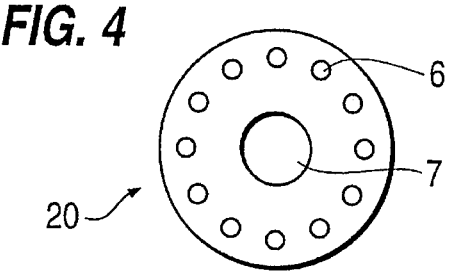
Figure 5:
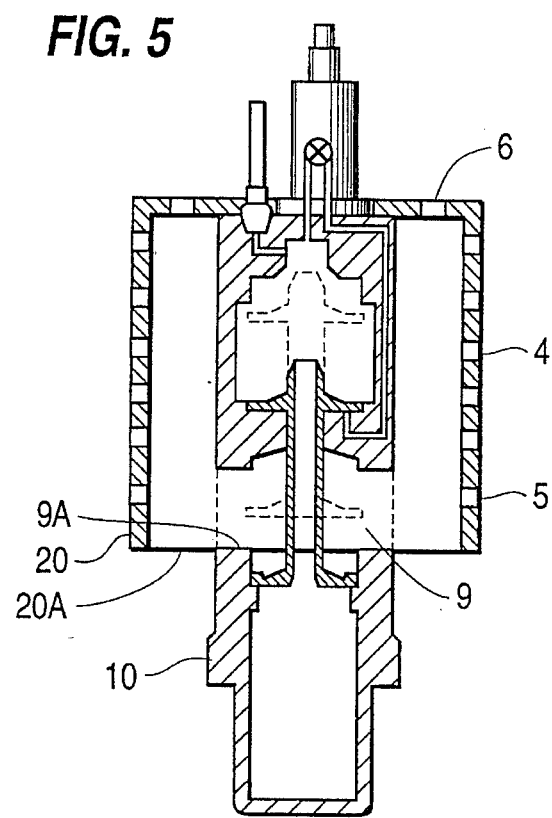
Figure 6:
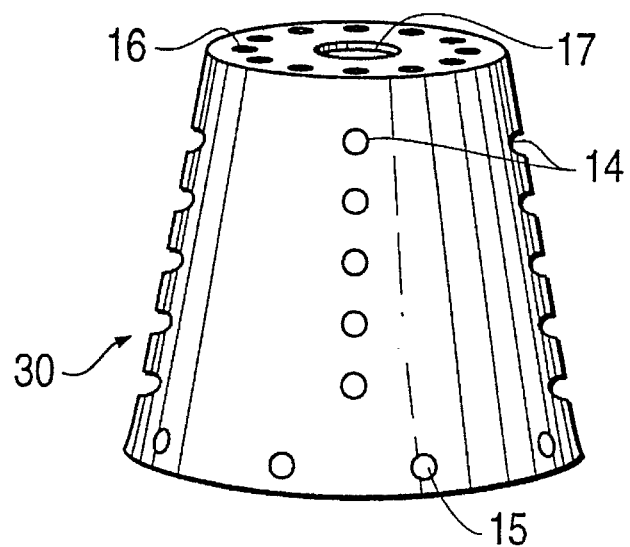
Figure 7:
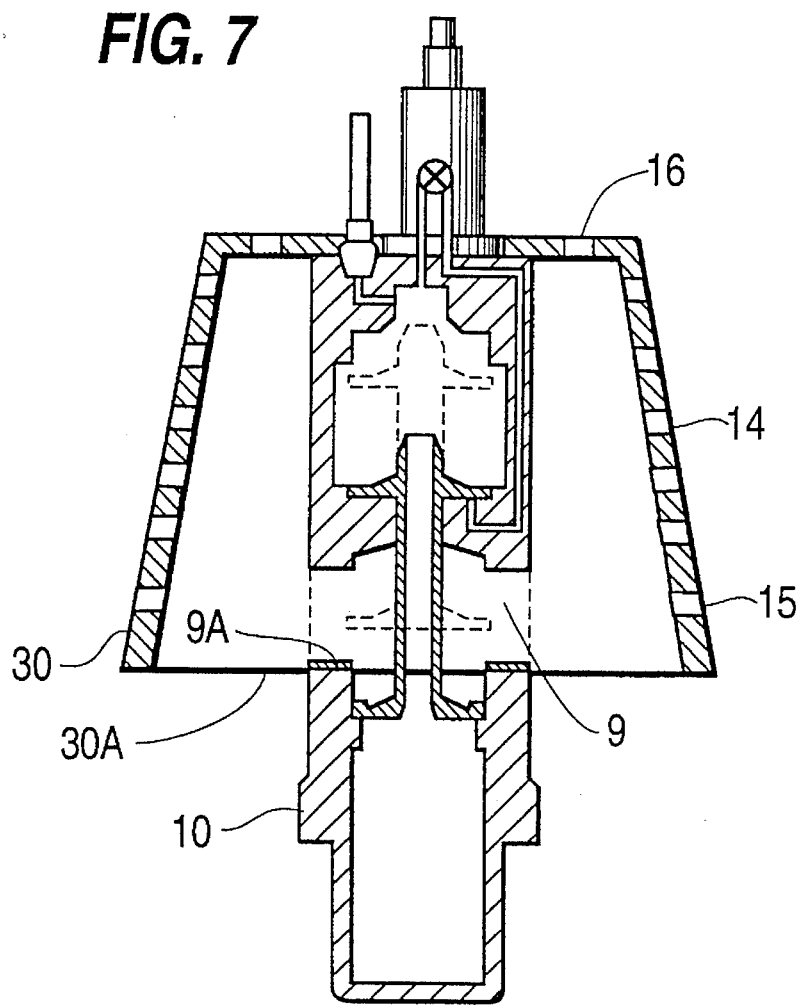
Figure 8:
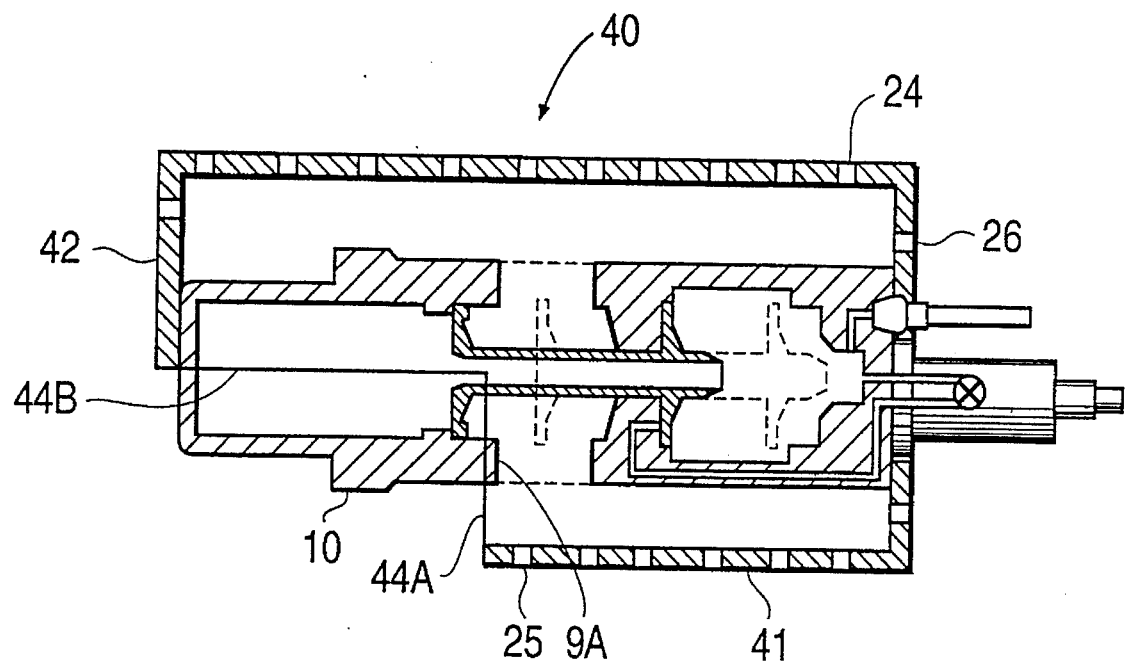
Figure 9:
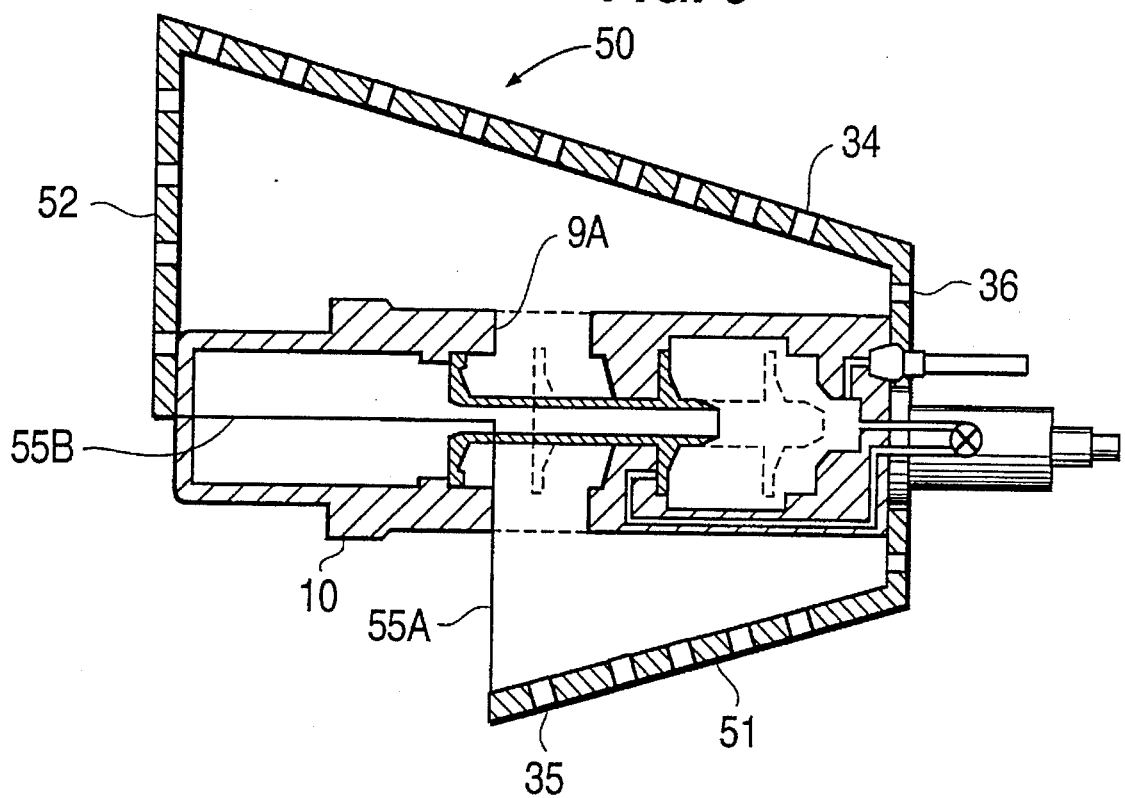

The invention, as well as various advantages thereof shall be explained more closely in the following description with reference to the drawings, wherein:

FIG. 1 snows a schematic and axial section through a known type of airgun, for example having four outlet ports, FIG. 2 in two diagrams (2A resp. 2B) shows characteristic pressure signatures from an airgun being not provided with and being provided with a screen arrangement according to the invention, FIG. 3 in lateral perspective view shows a possible embodiment of a screen which can be involved in an arrangement according to the invention, FIG. 4 shows the cylindrical screen in FIG. 3 from above, FIG. 5 shows an axial section through the airgun of FIG. 1, provided with a screen according to FIGS. 3 and 4, FIG. 6 in perspective view shows a conical embodiment of a screen for use in the arrangement according to the invention, FIG. 7 shows the screen of FIG. 6 mounted on an airgun as shown in FIG. 1, FIG. 8 shows the same airgun as in FIG. 1, intended for use in a horizontal position during operation, provided with a screen having a cylindrical main shape, and FIG. 9 shows an airgun in a corresponding position as in FIG. 8, but provided with a conical screen.

The airgun 10 in FIG. 1 is the kind of airgun which comprises an upper chamber 10B and a firing chamber 10C having a supply of high pressure air at 10A. A piston 8 is mounted centrally and axially between both chambers 10B and 10C, and upon firing is adapted to be displaced from the position shown with broken lines, i.e. upon release of the high pressure air so that the air can flow out through one or more ports 9 which are directed generally outwards from the longitudinal axis of the airgun. Firing release takes place by means of a solonoid valve at the top of the airgun 10.

FIG. 2A shows the near field signature of such an airgun having a certain size of the firing chamber (1.6 ins.$^3$) and with a supplied air pressure of 100 bar. This near field signature, which is the characteristic pressure signature from this and similar types of airguns, has a primary amplitude 1 and subsequent bubble pulses or amplitudes 2 which give the above discussed unfavourable effects during seismic measurements.

By providing a screen as shown in FIGS. 3 and 4 on the airgun 10 (see FIG. 5) as illustrated and mentioned above there is obtained a substantial improvement compared to the pressure signature in FIG. 2A, as will be explained below.

By mounting such a hydrodynamic screen 20 made of stainless steel or aluminum perforated with holes 4, 5, 6, at the outside of airgun 10, we obtain a screening of the bubble and a partial disintegration thereof. As a consequence of this the secondary bubble oscillations 2' are significantly attenuated, as can be observed in FIG. 2B. The hydrodynamic screen or bubble attenuator according to the invention, as shown in FIGS. 3–5 of the drawings, in principle has a cylindrical shape. However, many other main shapes can be employed, preferably having a rotational symmetry about an axis corresponding to the longitudinal axis of the airgun. In FIG. 5 it is not shown how the mounting means for the screen (bubble attenuator) on the airgun shall be designed, since there are many alternatives here, taking into account the various types of airguns on which the invention can be applied.

The operation of an airgun having a screen arrangement as described here, can be explained as follows:

When firing a seismic airgun (for example airgun 10) the air will quickly be vented out through port openings 9 and the airgun immediately starts to generate an acoustic pressure pulse in the water. The maximum primary amplitude 1 is obtained almost instantaneously when the ports are opened (2–8 milliseconds depending on the volume of the firing chamber 10C). The air being released excerts a pushing force on the surrounding water and accelerates the water radially outwards. The air will then expand, and since the water being set in movement will have a certain kinetic energy, the bubble will expand until the gas pressure has decreased to below the hydrostatic pressure. At the first maximum bubble size there will be observed a first minimum magnitude of the pressure signature as shown at 3 and 3' respectively in FIGS. 2A and 2B. Because of the hydrostatic pressure the bubble will start to contract and at the subsequent minimum radius there will be observed a first maximum of bubble amplitude 2. These oscillations will continue with gradually lower bubble amplitudes until the air bubble has risen to the surface, is equalized or destroyed.

Therefore, it is a primary object with the arrangement according to the invention to screen and destroy the bubble as well as in part to prevent the bubble from contracting again. This is done by providing holes (perforations) 4, 5, 6 in the screen 20. Some of these holes (5) are located directly outside the port openings 9 and some holes (4) are located at other places on the screen, so that the air is disintegrated and the water which shall retard the bubble movement will have a certain time delay. It is also important to provide holes 6 on top of the screen 20, namely around a larger central opening 7 which serves for the mounting of the screen on the airgun.

The manner of operation discussed above and the advantages obtained by the invention are related thereto, inter alia, that the volume delimited within the screen 20 is significantly smaller than the maximum bubble size which normally is generated by the airgun 10 under usual operational or working conditions. The size of screen 20 and the arrangement of holes 4, 5, 6 therein thus, to a substantial degree, will be determined by the airgun dimension or capacity, i.e., the amount of released air when firing the airgun. The design according to U.S. Pat. No. 3,525,416 referred to in the introduction above, for example will normally generate a bubble of diameter 1 meter, and according to this known solution the closed screen shall be larger than this bubble. For comparison an airgun of corresponding capacity will have a screen arrangement according to the invention of dimensions 20–30 cm, possibly as much as 50 cm diameter or lateral dimension, i.e. significantly smaller than the maximum bubble size normally being generated. In many cases it is preferred according to the invention that the volume which is generally delimited within the screen is smaller than the half of the normally maximum bubble size from the airgun concerned.

Another substantial feature of the arrangement according to the invention is seen therein that screen 20 has an open side or end adapted to face generally downwards in the normal operational position of the airgun. In the embodiment of FIG. 5 the airgun 10 is adapted to assume a vertical position during operation, and it is seen that screen 20 has a downwardly directed open end which is defined by the circular plate edge 20A. At this part of the screen 20 therefore there exists an opening which has a quite significant size in relation to the total surface area of the screen 20. Besides, this large opening at 20A is located in relative close association with the port or ports 9 for air exhausted from airgun 10. This arrangement is optimal in order to avoid as much as possible an attenuation of the primary amplitude of the pressure signature, as shown at 1 and 1' resp. in FIGS. 2A and 2B. The orientation described, implying that the open side or end of the screen in principle shall face downwardly in the operative position of the airgun, is related to the fact that the air bubble has a strong tendency to rise upwards in the water. Thus, the screen arrangement according to the invention to a substantial degree is adapted to "catch" the bubble by generally surrounding the bubble at its upper side and laterally.

More specifically, it appears from FIG. 5 that the above edge 20A of screen 20 around the open end thereof, runs approximately flush with the lower or outer edge 9A of the outlet port or ports 9. This geometrical relationship between outlet port 9 and the bordering edge of the screen around the opening, can be found at least partially also in the other embodiments according to the invention, to be discussed below with reference to FIGS. 7, 8 and 9. Thus, according to the invention it is preferred that the shape and dimensions of the screen arrangement are so adapted that edge portions of the screen along the opening lie substantially opposite the outlet port or ports, i.e. so that these portions just cover the port openings and therefore the air jet from these openings will impinge upon these portions of the screen wall immediately upon firing. Equally important, however, and as mentioned above, the open side or end of the screen is located closely adjacent to the ports of the airgun.

As regards the arrangement of perforations or holes in screen 20, reference is made to FIGS. 3 and 4, which show that screen 20 has a somewhat more open perforation in the form of holes 5 at the edge portions adjacent to edge 20A, than over neighbouring areas of the screen, where the holes 4 are located. Moreover, it appears, in particular from FIG. 4, that a more open perforation, i.e. a more dense arrangement of holes 6, is to be found at the end part of the screen 20 opposite of the opening at 20A. The more dense arrangement of holes 5 can be explained with reference to the higher intensity of air jets or exhaustion which impinge upon this part of screen 20, whereas the larger number of holes 6 at the top or end part around mounting opening 7, is related to the rising tendency of the air bubble. More particularly, water will flow in from the lower part of the screen, so that when the bubble rises, the air will be pressed upwardly towards the upper part and is gradually vented out through holes 6 at the top. The purpose of these holes and the arrangement shown is to enhance the process of disintegrating the bubble while it is rising. The regions within or at the screen to which the air bubble will move during the time after firing, depends on the buoyant effect in the water, and besides of water flow, possibly water flow or streams due to the towing of the airguns.

The perforation as a whole, i.e. the total assembly of holes 4, 5 and 6 in FIGS. 3–5, constitute at least 5% of the total surface area of the screen.

Because of the air bubble buoyancy the airgun will be subjected to a jumping movement upon firing. This effect must also be taken into account in optimizing the number and position of holes 4, 5, 6 and the size of these holes as well as the size and the weight of the screen. Thus, according to the invention, the screen is preferably weight loaded, possibly in the form of excess dimensions of the screen wall thickness, in particular at regions adjacent the open side or end thereof. Such a location will contribute to a better stability of the airgun with screen arrangement during operation. Moreover, and as mentioned, it is important that the screen extends at least to the lower portion of the port openings so that as much as possible of the bubble is caught.

In the embodiment of FIGS. 6 and 7 the screen 30 has a substantially conical main shape and is provided with a hole arrangement 14, 15, 16 being rather analogous to the perforation of the cylindrical screen 20 in FIGS. 3–5. Also in other respects the conical embodiment is analogous to the cylindrical embodiment, and both are adapted to assume a vertical position in operation. The lower bordering edge 30A of the screen 30 as shown in FIG. 7, is located at a level somewhat lower than the lower or outer edge portion 9A of the air openings 9 in the airgun. The conical embodiment apparently will make it easier to obtain a large opening facing downwards from the assembled arrangement of airgun 10 and screen 30.

The embodiments described above are both based on a vertical orientation of the airgun 10 under operation. The invention can also be adopted for situations where the airgun in operation assumes a more or less horizontal position, and two such embodiments are shown in FIG. 8 (cylindrical screen) and FIG. 9 (conical screen).

With an airgun which is lying or is being towed in a horizontal position, the screen and the location of the holes must be modified so that a major portion of the bubble at any time is caught within the bubble attenuator. In this case the screen must be extended and partially closed at some of the port openings so that for example there will be obtained a semi-cylindrical or possibly conical shape below the ports as shown in FIG. 8 and FIG. 9 respectively. The most important requirement with such a change of the airgun position with an accompanying modification of the shape of the bubble attenuator (the screen), still, however, is that the screen has an open side or end in a corresponding manner as in the preceding embodiments.

More particularly it is seen from FIG. 8 that the airgun 10 when used in a horizontal position, is provided with a cylindrical screen 40 which at its (right hand) end part is attached to the airgun in a similar way as in the preceding embodiments. This screen 40 is only partially cylindrical, i.e. along the wall part 41, since a cut-out with bordering edges 44A and 44B provides for the necessary open side or end. The edge 44A runs in a radial plane and forms a semicircle in relation to the central horizontal longitudinal axis of the airgun 10, whereas the edge 44B lies in an axial plane, as shown more or less coincident with the longitudinal axis. Accordingly, there is formed a semi-circular bottom part 42 which like the other wall parts of this screen 40 can be provided with perforation holes. Holes are shown at 24, 25 and 26 on the other wall parts, and these holes can be provided at a number and a distribution being based on corresponding principles as in the preceding embodiments.

The horizontal conical embodiment in FIG. 9 comprises a screen 50 having a conical wall part 51, a top or end part which is attached to the airgun 10, and a bottom part 52. This bottom part is clearly larger than the bottom part 42 in FIG. 8. Likewise, the open side or end which in FIG. 9 is delimited by edges 55A and 55B, will be larger than the corresponding opening in FIG. 8. This apparently is due to the conical shape, as also mentioned above. In FIG. 9 there is shown holes 34, 35 and 36 in analogy with the preceding embodiments.

The bordering edges 44A (FIG. 8) and 55A (FIG. 9) extend approximately radially flush with the corresponding outer edge 9A of outlet ports 9. Also in these two last embodiments the screen (40 and 50 resp.) will be able to catch most of the air mass being released immediately upon firing, at the same time as the free opening which is partially facing downwards, permits the primary pulse amplitude not to be significantly reduced.

Among possible modifications in relation to the embodiments being illustrated and described above, there is mentioned for example that common airgun types being employed can have a single outlet port extending in principle without interruption through 360° around the axis of the airgun. The screen arrangement according to the invention apparently will be effective without problems also with such airguns. In the figures of drawings the perforation is shown in the form of circular holes, but it is obvious that also other hole shapes may be employed. With the embodiments in FIGS. 8 and 9 in addition to a fixed or rigid attachment of the screen at the top (right hand end) of the airgun 10, it will also be practical to have an attachment device at the opposite end (bottom) of the arrangement.

I claim:

1. Seismic airgun arrangement for attenuating unwanted oscillations in the emitted signal, the airgun has one or more outlet ports for exhausting air in a generally radial direction from a central axis of the airgun, and a perforated screen of plate material is provided around the airgun for the attenuation mentioned, wherein the volume generally delimitated within the screen is significantly smaller than the maximum bubble size which is normally generated by the airgun, wherein the screen has an open side or end at a part of the screen that is adapted to face at least partially downwards in the normal operative position of the airgun, and wherein at least edge portions of the screen along the open side or end are located substantially directly opposite the outlet port or ports.

2. Arrangement according to claim 1, wherein the volume delimited within the screen generally is smaller than half of the maximum bubble size which is normally generated by the airgun.

3. Arrangement according to claim 1, wherein the screen comprises a substantially cylindrical main shape.

4. Arrangement according to claim 1, wherein the screen comprises a substantially conical main shape with the open side or end at a wider part of the conical screen.

5. Arrangement according to claim 1, wherein the edge of the screen at the open side or end runs at least partially substantially radially flush with a corresponding outer edge of one or more outlet parts.

6. Arrangement according to claim 1, wherein the edge portions have a more open perforations than adjacent surface regions of the screen.

7. Arrangement according to claim 1, wherein an end part of the screen opposite to the open side or end has a more open perforations than adjacent surface regions of the screen.

8. Arrangement according to claim 1, wherein the perforations in total constitutes at least 5% of the whole surface area of the screen.

9. Arrangement according to claim 1, wherein the screen is rigidly attached to the airgun at a central portion of an end part of the screen opposite of the open side or end.

10. Arrangement according to claim 1, wherein the screen is loaded in the form of an oversized wall thickens in the screen at regions adjacent the open side or end.

* * * * *